(12) United States Patent
Kauffman et al.

(10) Patent No.: US 8,190,147 B2
(45) Date of Patent: May 29, 2012

(54) INTERNETWORKING AIR-TO-AIR NETWORK AND WIRELESS NETWORK

(75) Inventors: Donald C. Kauffman, Laurel, MD (US); Louis Toth, Baltimore, MD (US); Eric N. Foster, New Freedom, PA (US)

(73) Assignee: Honeywell International Inc., Morristown, NJ (US)

( * ) Notice: Subject to any disclaimer, the term of this patent is extended or adjusted under 35 U.S.C. 154(b) by 946 days.

(21) Appl. No.: 12/143,369

(22) Filed: Jun. 20, 2008

(65) Prior Publication Data
US 2009/0318137 A1 Dec. 24, 2009

(51) Int. Cl.
*H04W 84/06* (2009.01)
(52) U.S. Cl. .......................... 455/428; 370/316; 701/120
(58) Field of Classification Search ................ 455/422.1, 455/428, 431; 370/316, 338, 352, 238, 252; 701/120, 122, 302
See application file for complete search history.

(56) References Cited

U.S. PATENT DOCUMENTS

| | | | |
|---|---|---|---|
| 4,414,661 A | 11/1983 | Karlstrom | |
| 4,901,307 A | 2/1990 | Gilhousen et al. | |
| 5,095,480 A | 3/1992 | Fenner | |
| 5,530,909 A | 6/1996 | Simon et al. | |
| 5,710,764 A | 1/1998 | Yoshimura et al. | |
| 5,835,059 A | 11/1998 | Nadel et al. | |
| 6,018,659 A | 1/2000 | Ayyagari | |
| 6,047,165 A | 4/2000 | Wright et al. | |
| 6,064,335 A | 5/2000 | Eschenbach | |
| 6,084,870 A | 7/2000 | Wooten | |
| 6,104,712 A | 8/2000 | Robert et al. | |
| 6,108,539 A | 8/2000 | Ray et al. | |
| 6,147,980 A | 11/2000 | Yee et al. | |
| 6,148,179 A | 11/2000 | Wright | |
| 6,154,636 A | 11/2000 | Wright et al. | |
| 6,160,998 A | 12/2000 | Wright et al. | |
| 6,163,681 A | 12/2000 | Wright et al. | |
| 6,173,230 B1 | 1/2001 | Camus et al. | |
| 6,181,990 B1 | 1/2001 | Grabowsky et al. | |
| 6,195,189 B1 | 2/2001 | Nishihata et al. | |
| 6,259,379 B1 | 7/2001 | Paterson et al. | |
| 6,262,659 B1 | 7/2001 | Korkosz et al. | |

(Continued)

FOREIGN PATENT DOCUMENTS
EP 967815 12/1999
(Continued)

OTHER PUBLICATIONS

"The ATN SARPs Third Edition", "Manual of Technical Provisions for the Aeronautical Telecommunications Network—ICAO DOC 9705/AN956",, Publisher: ATN.

(Continued)

*Primary Examiner* — Kamran Afshar
*Assistant Examiner* — Khawar Iqbal
(74) *Attorney, Agent, or Firm* — Fogg & Powers LLC (57) ABSTRACT

Methods and systems of operating a communication system are provided. One method comprises establishing at least one communication link between a mobile-to-mobile communication network of mobile nodes and at least one route computing system via gateway node. The gateway node is one of the mobile nodes that is in communication with a wireless network. Moreover, the route computing system is in communication with a terrestrial network that is also in communication with the wireless network. The at least one established communication link is then used to communicate messages.

15 Claims, 6 Drawing Sheets

U.S. PATENT DOCUMENTS

| | | | |
|---|---|---|---|
| 6,271,768 B1 | 8/2001 | Frazier, Jr. | |
| 6,285,878 B1 | 9/2001 | Lai | |
| 6,308,044 B1 | 10/2001 | Wright et al. | |
| 6,353,779 B1 | 3/2002 | Simon et al. | |
| 6,438,468 B1 | 8/2002 | Muxlow et al. | |
| 6,477,152 B1 | 11/2002 | Hiett | |
| 6,606,055 B2 | 8/2003 | Halsema et al. | |
| 6,643,274 B2 | 11/2003 | D'Annunzio | |
| 6,677,888 B2 | 1/2004 | Roy | |
| 6,744,396 B2 | 6/2004 | Stone et al. | |
| 6,778,825 B2 | 8/2004 | Parkman | |
| 6,781,513 B1 | 8/2004 | Korkosz et al. | |
| 6,788,935 B1 | 9/2004 | McKenna et al. | |
| 6,795,408 B1 | 9/2004 | Hiett | |
| 6,810,527 B1 | 10/2004 | Conrad et al. | |
| 6,816,728 B2 | 11/2004 | Igloi et al. | |
| 6,819,670 B1 | 11/2004 | Fenner | |
| 6,915,189 B2 | 7/2005 | Igloi et al. | |
| 6,925,088 B1 | 8/2005 | Moreaux | |
| 6,931,248 B2 | 8/2005 | Borel | |
| 6,940,832 B2 | 9/2005 | Saadawi et al. | |
| 6,965,816 B2 | 11/2005 | Walker | |
| 6,970,444 B2 | 11/2005 | Chwieseni et al. | |
| 6,990,319 B2 | 1/2006 | Wright et al. | |
| 7,027,812 B2 | 4/2006 | Dastrup et al. | |
| 7,072,977 B1* | 7/2006 | Bernard et al. | 709/238 |
| 7,085,290 B2 | 8/2006 | Cain | |
| 7,085,562 B1 | 8/2006 | Holder et al. | |
| 7,116,266 B1 | 10/2006 | Vesel et al. | |
| 7,177,939 B2 | 2/2007 | Nelson et al. | |
| 7,181,160 B2 | 2/2007 | Barrett | |
| 7,187,927 B1 | 3/2007 | Mitchell | |
| 7,343,157 B1 | 3/2008 | Mitchell | |
| 7,454,203 B2 | 11/2008 | Levitan | |
| 7,519,014 B2 | 4/2009 | Allen et al. | |
| 7,599,314 B2* | 10/2009 | Wittenschlaeger | 370/254 |
| 7,633,873 B1 | 12/2009 | Kohler | |
| 7,643,426 B1 | 1/2010 | Lee | |
| 7,756,508 B1 | 7/2010 | Usher et al. | |
| 7,769,028 B2 | 8/2010 | Boley et al. | |
| 7,814,322 B2 | 10/2010 | Gurevich et al. | |
| 7,876,736 B2 | 1/2011 | Inoue | |
| 7,907,893 B2 | 3/2011 | Karabinis et al. | |
| 7,940,669 B2 | 5/2011 | Vaswani et al. | |
| 2002/0009993 A1 | 1/2002 | Dastrup et al. | |
| 2002/0168971 A1 | 11/2002 | Parkman | |
| 2002/0191573 A1 | 12/2002 | Whitehill et al. | |
| 2003/0003872 A1 | 1/2003 | Brinkley et al. | |
| 2003/0071743 A1 | 4/2003 | Seah et al. | |
| 2003/0072252 A1 | 4/2003 | Gurney | |
| 2003/0073406 A1 | 4/2003 | Benjamin | |
| 2003/0158963 A1 | 8/2003 | Sturdy | |
| 2003/0231574 A1 | 12/2003 | Okuda et al. | |
| 2004/0008253 A1 | 1/2004 | Monroe | |
| 2004/0028003 A1 | 2/2004 | Diener et al. | |
| 2004/0132495 A1 | 7/2004 | Horton, Jr. et al. | |
| 2004/0235469 A1 | 11/2004 | Krug | |
| 2005/0026609 A1 | 2/2005 | Brinkley et al. | |
| 2005/0053026 A1 | 3/2005 | Mullan et al. | |
| 2005/0054346 A1 | 3/2005 | Windham et al. | |
| 2005/0064895 A1 | 3/2005 | Oesterling et al. | |
| 2005/0090201 A1* | 4/2005 | Lengies et al. | 455/41.2 |
| 2005/0108374 A1* | 5/2005 | Pierzga et al. | 709/223 |
| 2005/0143013 A1 | 6/2005 | Jha | |
| 2005/0174950 A1 | 8/2005 | Ayyagari | |
| 2005/0197748 A1 | 9/2005 | Holst et al. | |
| 2005/0220055 A1 | 10/2005 | Nelson et al. | |
| 2005/0221814 A1 | 10/2005 | Fagan et al. | |
| 2005/0221818 A1 | 10/2005 | Johnson et al. | |
| 2005/0232185 A1* | 10/2005 | Hudson et al. | 370/328 |
| 2005/0281270 A1 | 12/2005 | Kossi | |
| 2005/0286452 A1 | 12/2005 | Hardgrave et al. | |
| 2006/0023677 A1 | 2/2006 | Labrador et al. | |
| 2006/0031394 A1 | 2/2006 | Tazuma | |
| 2006/0080451 A1 | 4/2006 | Eckert | |
| 2006/0098608 A1 | 5/2006 | Joshi | |
| 2006/0176842 A1 | 8/2006 | Tamura | |
| 2006/0178141 A1 | 8/2006 | McGuffin et al. | |
| 2006/0183474 A1* | 8/2006 | Ziarno et al. | 455/431 |
| 2006/0205345 A1 | 9/2006 | Ishikawa | |
| 2007/0042773 A1 | 2/2007 | Alcorn | |
| 2007/0042774 A1 | 2/2007 | Alcorn | |
| 2007/0072590 A1 | 3/2007 | Levitan | |
| 2007/0150939 A1 | 6/2007 | Aaron | |
| 2007/0183435 A1 | 8/2007 | Kettering et al. | |
| 2007/0213009 A1 | 9/2007 | Higashida et al. | |
| 2007/0284474 A1 | 12/2007 | Olson | |
| 2007/0286097 A1 | 12/2007 | Davies | |
| 2007/0297416 A1 | 12/2007 | Boley | |
| 2008/0117858 A1 | 5/2008 | Kauffman | |
| 2008/0144617 A1 | 6/2008 | Molsberry et al. | |
| 2008/0150784 A1 | 6/2008 | Zhang | |
| 2008/0151811 A1* | 6/2008 | El-Damhougy et al. | 370/316 |
| 2008/0186897 A1 | 8/2008 | Rune | |
| 2008/0186907 A1* | 8/2008 | Yagyuu et al. | 370/328 |
| 2008/0205283 A1 | 8/2008 | McGuffin et al. | |
| 2008/0240038 A1 | 10/2008 | Lynche et al. | |
| 2008/0240062 A1 | 10/2008 | Lynch et al. | |
| 2008/0274734 A1 | 11/2008 | Kostanic | |
| 2009/0005041 A1 | 1/2009 | Steinberg | |
| 2009/0041041 A1 | 2/2009 | True et al. | |
| 2009/0058682 A1 | 3/2009 | True | |
| 2009/0077626 A1 | 3/2009 | Leclercq et al. | |
| 2009/0092074 A1 | 4/2009 | Jamalipour | |
| 2009/0103452 A1 | 4/2009 | Horvath | |
| 2009/0103473 A1* | 4/2009 | Foster et al. | 370/316 |
| 2009/0141669 A1* | 6/2009 | Kauffman | 370/328 |
| 2009/0197595 A1* | 8/2009 | Kauffman et al. | 455/431 |
| 2009/0318137 A1 | 12/2009 | Kauffman et al. | |
| 2009/0318138 A1 | 12/2009 | Zeng et al. | |
| 2010/0057899 A1 | 3/2010 | Henkel | |
| 2010/0157905 A1 | 6/2010 | Ahn et al. | |
| 2010/0272012 A1 | 10/2010 | Knefelkamp | |

FOREIGN PATENT DOCUMENTS

| | | |
|---|---|---|
| EP | 1793512 | 6/2007 |
| EP | 1850543 | 10/2007 |
| EP | 1926234 | 5/2008 |
| WO | 03053013 | 6/2003 |
| WO | 2005069545 | 7/2005 |
| WO | 2007022353 | 2/2007 |
| WO | 2007043827 | 4/2007 |
| WO | 2007054410 | 5/2007 |
| WO | 2007059560 | 5/2007 |
| WO | 2008007861 | 1/2008 |

OTHER PUBLICATIONS

Avionica, "Securelink",, pp. 1-2, Publisher: AVIONICA.

Carlos Jodar et al., "WI-FI Gatelink Trial Frankfurt and Muich, Germany White Paper", Aug. 9, 2006, pp. 1-18, Publisher: ARINC Proprietary.

Eklund et al., "IEEE Standard 802.16: A Technical Overview of the Wirelessman Air Interface for Broadband Wireless Access", "IEEE Communications Magazine", Jun. 2002, pp. i-107, Publisher: IEEE.

Hardy et al., "Aircraft Network and File Server—ARINC 763", Oct. 16, 2002, pp. 1-12, Publisher: AEEC (Airlines Electronic Engineering Committee).

"Technical Overview for Mark III Communications Management Unit (CMU)",, pp. 1-59, Publisher: Honeywell Aerospace Electronic Systems.

Hurlburt et al., "A Data Communications Concept for a SATS Scenario", "4th Integrated CNS Technologies Conference and Workshop", Apr. 2004, pp. 1-20.

Cordeiro et al., "IEEE 802.22: An Introduction to the First Wireless Standard Based on Congitive Radios", "Journal of Communications", Apr. 2006, pp. 38-47, vol. 1, No. 1, Publisher: Academy Publisher.

Ivancic, "Modular, Cost-Effective, Extensible AVIONICS Architecture for Secure Mobile Communications", "2006 IEEE Aerospace Conference—Mar. 4-11, 2006 Big Sky, Montana", 2006, pp. 1-9, Publisher: IEEE.

Teledyne Technologies Inc., "Wireless Groundlink System (WGL)", "www.teledyne-controls.com/productsolution.wirelessgroundlink. groundlink.asp", 2007, pp. 1-2, Publisher: Teledyne Technologies Inc.

Teledyne Technologies Inc., "New Release", "www.teledyne-controls.com/newscenter/sco.asp", 2007, pp. 1-2, Publisher: Teledyne Technologies Inc.

Polajnar et al., "Simple and Efficient Protocols for Guaranteed Message Delivery in Wireless Ad-hoc Networks", "Wireless and Mobile Computing, Networking and Communications 2005", Aug. 22, 2005, pp. 93-100, vol. 3, Publisher: IEEE, Published in: Piscataway, NJ.

Sakhaee et al., "Aeronautical ad hoc Networks", "Wireless Communications and Networking Conference", Jan. 1, 2006, pp. 246-251, Publisher: IEEE, Published in: Piscataway, NJ.

Zhou et al., "GeoLANMAR: Geo Assisted Landmark Routing for Scalable, Group Motion Wireless Ad Hoc Networks", "Vehicular Technology Conference 2005", May 30, 2005, pp. 2420-2424, vol. 4, Publisher: IEEE, Published in: Piscataway, NJ.

European Patent Office, "European Search Report", Sep. 25, 2009, Published in: EP.

Mouza et al., "Mobility Patterns", "Proceedings of the Second Workshop on Spatio-Temporal Database Management", Jul. 23, 2004, pp. 1-8, Published in: Toronto, Canada.

Samal, "Mobility Pattern Aware Routing in Mobile AD HOC Network", May 2003, pp. 1-82, Publisher: Virginia Polytechnic Institute and State University, Published in: Blacksburg, Virginia.

Vyas et al., "Location and Mobility Pattern Based Routing Algorithm for Mobile AD HOC Wireless Networks", "http://www.scs.org/getDoc.cfm?id=2466", 2003, pp. 695-700, Publisher: The Society for Modeling and Simulation International.

European Patent Office, "Office Action", Apr. 8, 2011, Published in: EP.

* cited by examiner

INTERNETWORKING AIR-TO-AIR NETWORK AND WIRELESS NETWORK

BACKGROUND

Existing aeronautical data link services based on VHF ground stations, which are installed across landmasses to provide line-of-sight air-to-ground data link communications, are relatively expensive for airspace users. This is in part due to capital equipment required to install the ground stations as well as on going maintenance costs. In particular, current domestic aeronautical data links (ACARS) use an expensive, in terms of both capital and maintenance, ground station network where the ground stations are spaced approximately every 150 miles, where 150 miles is the approximate radio range of VHF communications from an aircraft. This results in hundreds of ground stations, used only for aeronautical data link, in high density domestic airspaces in the US, Europe and other areas around the world. These ACARS networks work in a star configuration where ground stations are connected to a central processor which serves as the master router. The central processor knows the ground station used for a downlink from an aircraft and uses that same ground station for an uplink to the aircraft. If the aircraft does not respond to an uplink, the central processor sends the message out via adjacent ground stations until it finds the aircraft.

Air-to-air networking provides one possible solution which does not rely on capital intensive ground stations. In an air-to-air network, aircraft form mobile nodes capable of relaying messages from one aircraft to another aircraft or to a ground station at the intended destination which is beyond the communication range of the originating aircraft. Air-to-air networks, where the message is relayed entirely via the air-to-air network from the source to the destination, however, have a disadvantage when a message needs to be relayed over a long distance because they consume more radio frequency spectrum than direct air-to-ground communications.

For the reasons stated above and for other reasons stated below which will become apparent to those skilled in the art upon reading and understanding the present specification, there is a need in the art for a cost effective method for aeronautical communications.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of operating a communication system is provided. The method comprises establishing at least one communication link between a mobile-to-mobile communication network of mobile nodes and at least one route computing system via gateway node. The gateway node is one of the mobile nodes that is in communication with a wireless network. Moreover, the route computing system is in communication with a terrestrial network that is also in communication with the wireless network. The at least one established communication link is then used to communicate messages.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention utilize hybrid air-to-air and wireless networks to provide aeronautical communications. In particular, in embodiments, air-to-air networks are used until an aircraft comes within the range of a wireless network. This is possible, with the emergence of wireless networks with metropolitan coverage of approximately several kilometers up to 100 kilometers and beyond. The use of wireless networks provides a cost effective solution for aeronautical communications. Embodiments take advantage of commercially available wireless networks, such as but not limited to, WiMAX and Wireless Regional Area Networks (WRANs) which are emerging in the marketplace. Since WiMAX and WRAN can handle significantly more data traffic than ACARS and will have many more paying customers, the cost per kilobyte should be much less. The drawback is the shorter range. As discussed above, Wireless WiMAX will likely have ranges up to several km and WRANs perhaps up to 100 km. To communicate with aircraft further away from the WiMAX or WRAN access point or base station, this invention makes use of air-to-air networking, where the aircraft act as ad-hoc nodes. One element of the communication system of embodiments is a Ground Station Controller which is a router that maintains the routing topology of aircraft (mobile nodes) that are within communications range of a wireless access point (transceiver).

Figure 1:
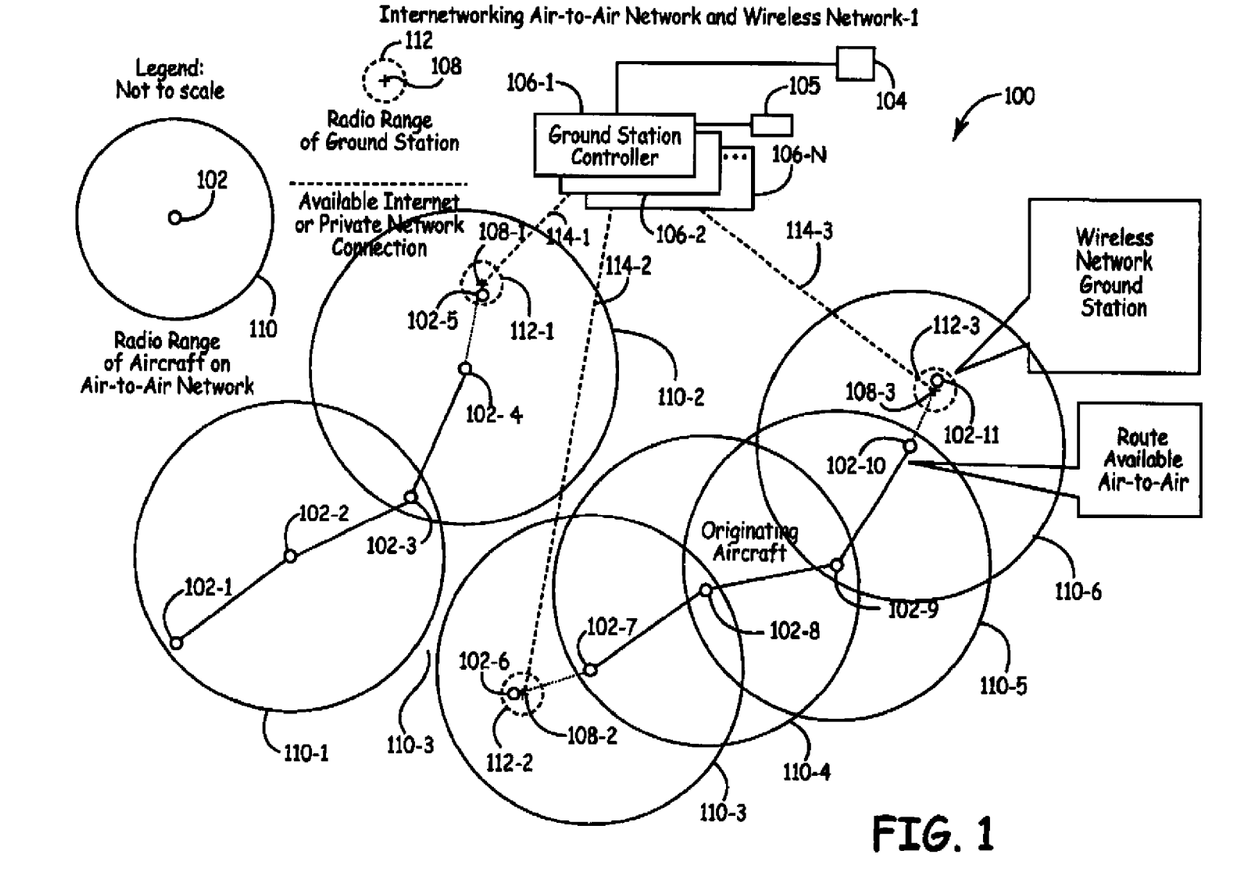
FIG. 1 illustrates a communication network of one embodiment of the present invention.

Referring to FIG. 1, an example of a communication network 100 of one embodiment is illustrated. As illustrated, this network 100 includes ground station controllers (GSC) 106 (1-N) and a terrestrial end system 104. Each GSC 106 can be generally referred to as a route computing system. As discussed above, each GSC 106 is a router that maintains the topology of aircraft that are within communication range of wireless access points in a memory 105. The network 100 also includes aircraft 102-1 through 102-11, ground stations 108-1 through 108-3 and an end system 104. In FIG. 1, some aircraft 102 include an indication of a radio range 110-1 through 110-6. For example, aircraft 102-2 has a radio range 110-1. The ground stations 108 also include an indication of a radio range 112-1 through 112-3. For example, ground station 108-1 has a radio range of 112-1. The ground stations 108 are in communication with the GSC 106 via communication links 114-1 through 114-3 which are part of a network such as but not limited to the internet. The network can be generally referred to as a terrestrial network. In embodiments, the aircraft 102 form ad-hoc communication networks to pass messages between communication peers in a communication network 100. The communication peers are made up of the aircrafts 102 and the end system 104. Although, embodiments of the present invention are described above and below as applying to air-to-air communication networks, other embodiments apply to any type of mobile-to-mobile communication network and the present invention is not limited to air-to-air communication networks.

Figure 2:
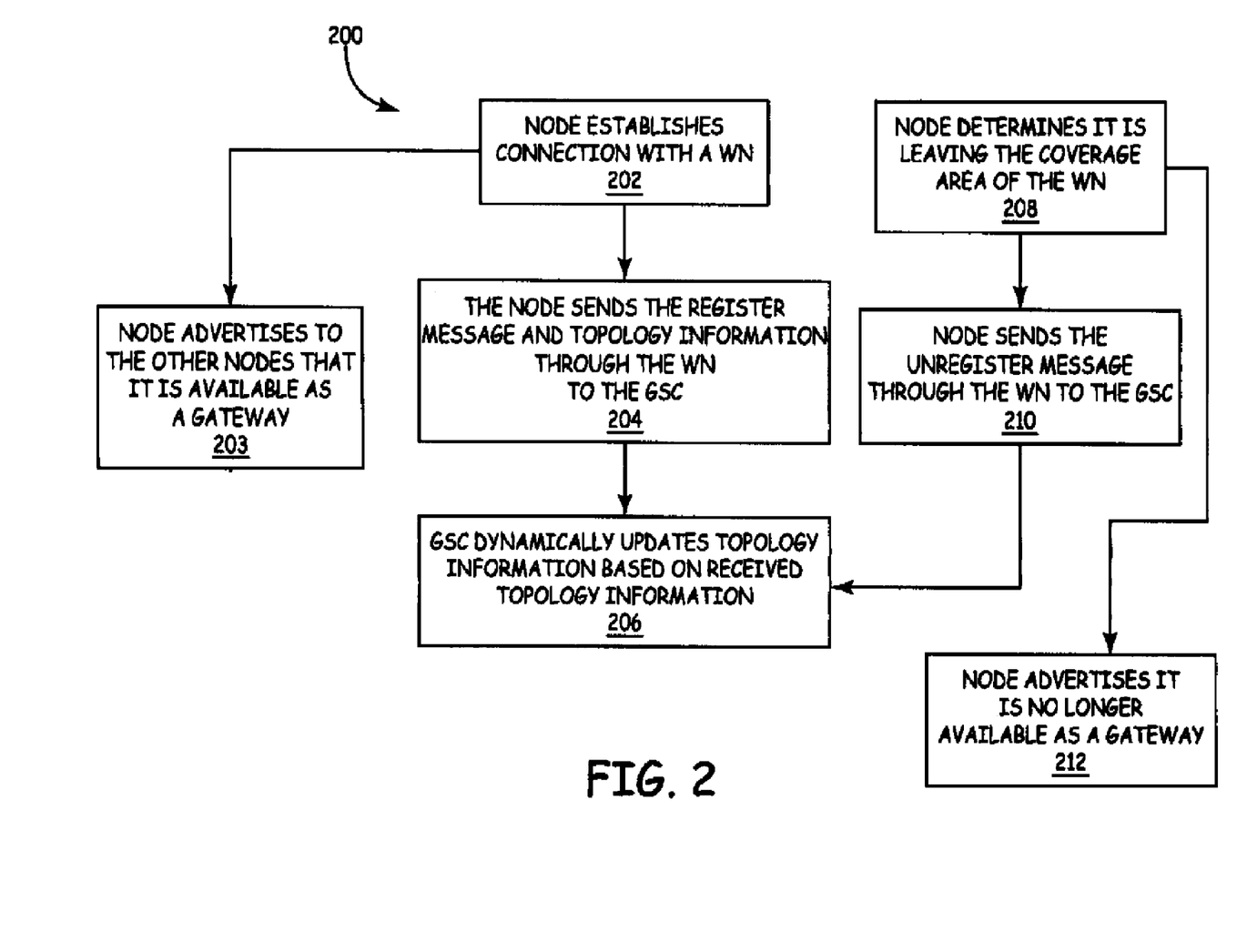
FIG. 2 illustrates a register and unregister flow diagram of one embodiment of the present invention.

As discussed above, embodiments establish communication paths through the communication network 100. That is, embodiments establish communication paths both to and from any airborne (mobile) node and a terrestrial node (one fixed, wired or wireless on a network such as an internet network) via an air-to-air network and a WiMAX, WRAN or similar wireless communication network (herein generally referred to as a Wireless Network (WN)). Referring to FIG. 2, a register and unregister flow diagram 200 is illustrated. It illustrates one method of registering and unregistering a gateway with a GSC as well as the topology information transfer. As illustrated, the process begins when an aircraft (node) establishes a connection with a WN (202). Once, a connection is established between the node (which will be the gateway) and the WN through a respective ground station 108, the node sends the topology information it has to the GSC over a terrestrial network such as but not limited to an internet protocol (IP) Network (204). The topology information relates to the connectivity status, location and identification of nodes (aircraft) that make up the air-to-air network with which the gateway node is associated. An example of a system that discovers the topology of the air-to-air network is provided in the commonly assigned patent application having an application Ser. No. 12/025,685, entitled "Use of Alternate Communication Networks to Complement an Ad-Hoc mobile node to Mobile Node Communication Network", which is herein incorporated in its entirety. If the gateway node is not already registered with the GSC, it registers itself as a gateway to its associated air-to-air network with the GSC (204). The GSC dynamically updates topology information in the memory 105 associated with each registered gateway based on the received topology information (206). In embodiments, the gateway also initially advertises to its associated air-to-air network that it is available as a gateway to the ground (203). In embodiments, the gateway further periodically advertises to its associated air-to-air network that it is still available as a gateway to the ground. Further in embodiments, each gateway periodically sends its then current topology to the GSC (204). Examples of gateway nodes (or gateway aircraft) are aircraft 102-5, 102-6 and 102-11 of FIG. 1.

As also illustrated, in flow diagram 200 of FIG. 2, in embodiments, when a gateway node determines it is leaving the radio range of the WN (208), the gateway node sends an unregister message though the respective ground station to the GSC (210). The GSC then dynamically updates its topology information based on the received information (206). Different events can be used to trigger an unregister message. Examples of events include but are not limited to, an aircraft departing an airport which has a WN access point, the aircraft traveling a predetermined distance since it established connectivity with the WN access point as well as events determined by algorithms that indicate the gateway node is moving outside of the range of a peer receiver. By unregistering the gateway aircraft, the GSC is prevented from using the aircraft as an entry point to the air-to-air communication network after the aircraft has left the WN coverage. As FIG. 2 also illustrates, the node also advertises to its associated air-to-air network that it is no longer available as a gateway to the ground when it determines it is leaving the radio range of the WN (212).

Figure 3A:
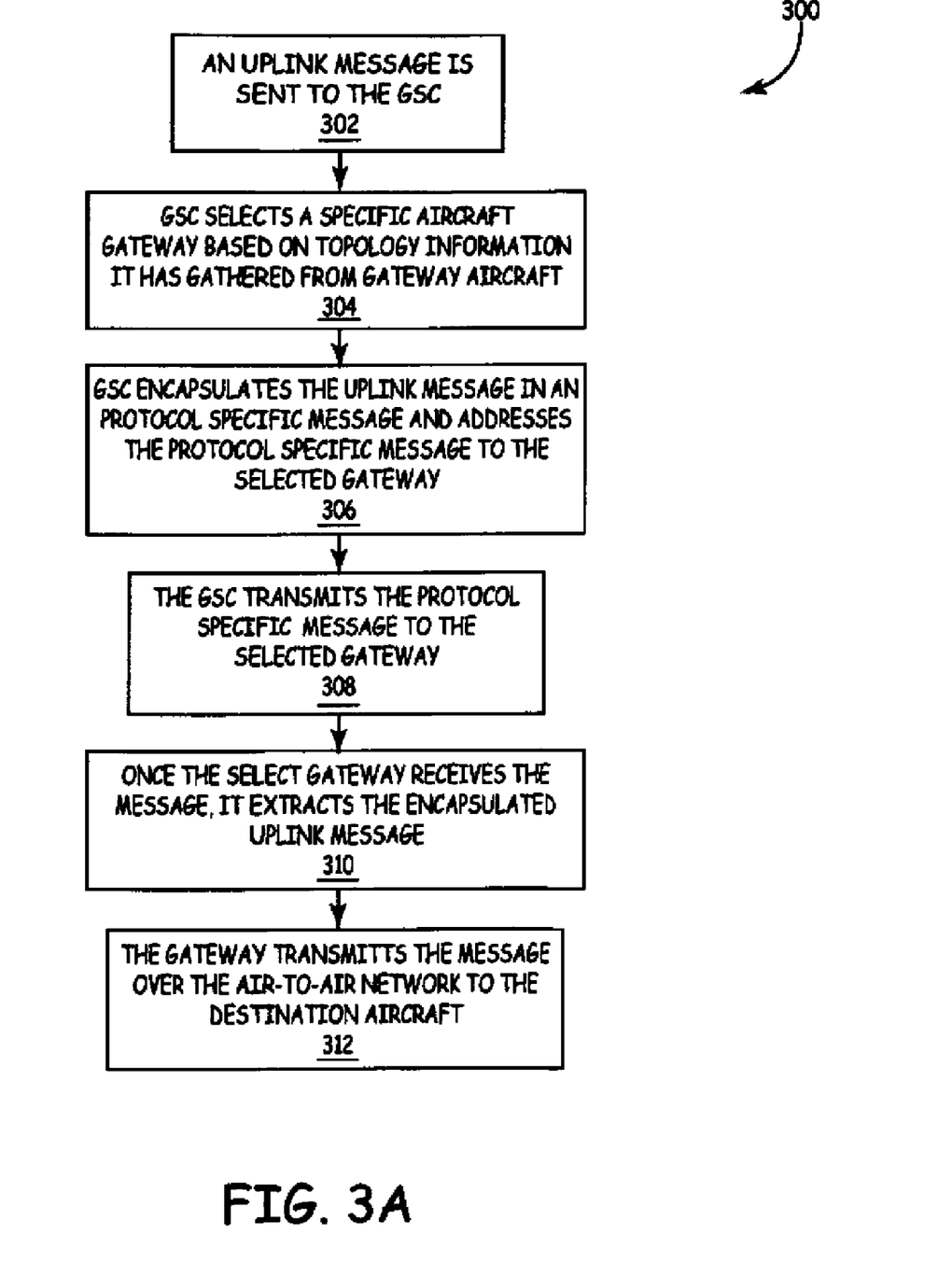
FIG. 3A illustrates an uplink message flow diagram of one embodiment of the present invention.

FIG. 3A illustrates an uplink message flow diagram 300 of one embodiment of the present invention. In particular, it illustrates an example of one method of delivering a message to an aircraft through the communication network 100. In this example, an end system 104 wants to deliver a message to an aircraft. The end system 104 sends the uplink message to a GSC 106 (302). The GSC selects a specific aircraft gateway based on the then current topology information it has on the air-to-air networks in the communication network 100 (304). The GSC encapsulates the uplink information in a message having a protocol specific format used by the wireless network and addresses the message to the selected gateway (306). An example of a message protocol is an IP message having an IP address of the selected gateway. Although, the following description describes embodiments using IP messages and IP addresses, the present invention is not limited to IP messages. As stated above, any type of terrestrial network having its own protocol can be used. The GSC then transmits the protocol specific message to the selected gateway via the associated ground station 108 through the internet (308). Since a protocol specific message is used, basic routing used by the terrestrial network directs the delivery of the protocol specific message through the ground station (108) to the gateway aircraft (102). Once, the gateway receives the protocol specific message it extracts the uplink message (310). In embodiments, the encapsulated message contains addressing information used to determine routing of the message to the destination aircraft through the air-to-to air network. The addressing information may include but is not limited to, aircraft tail number, an International Civil Aviation Organization (ICAO) aircraft ID address or another type of address identification scheme. The gateway then uses the air-to-air network to deliver the uplink message to the destination aircraft (312) based on the then current topology of the air-to-air communication network.

Referring to FIG. 1, an example of the delivery of an uplink message is provided. In this example, end system 104 needs to deliver an uplink message to aircraft (node) 102-1. In this example, the end system 104 sends the uplink message to a GSC 106 which in this example is GSC 106-1. Once the GSC 106 receives the message, it determines where the destination aircraft is based on its then current topology information received via the gateway aircraft 102-5. In this example, GSC 106 will recognize based on the then current topology information that the destination aircraft 102-1 can be reached via gateway aircraft 102-5 through a WN of ground station 108-1 and the air-to air network made up of gateway aircraft 102-5, aircraft 102-4, aircraft 102-3, aircraft 102-2 and the destination aircraft 102-1. Communication link 114-1 (like connections 114-2 and 114-3) are available internet or private network connections. In one embodiment using an internet connection, an IP address of the gateway aircraft 102-5 is used to deliver the uplink message over communication link 114-1. Accordingly, based on this information, internet routers send the uplink message to ground station 108-1 via communication link 114-1. Ground station 108-1 then transmits the uplink message via the wireless network (WN) to gateway aircraft 102-5 that is within the radio range 112-1 of the WN. The uplink message is then passed to destination aircraft 102-1, via the path through the air-to air network made up of gateway aircraft 102-5, aircraft 102-4, aircraft 102-3, aircraft 102-2 and the destination aircraft 102-1.

Figure 3B:
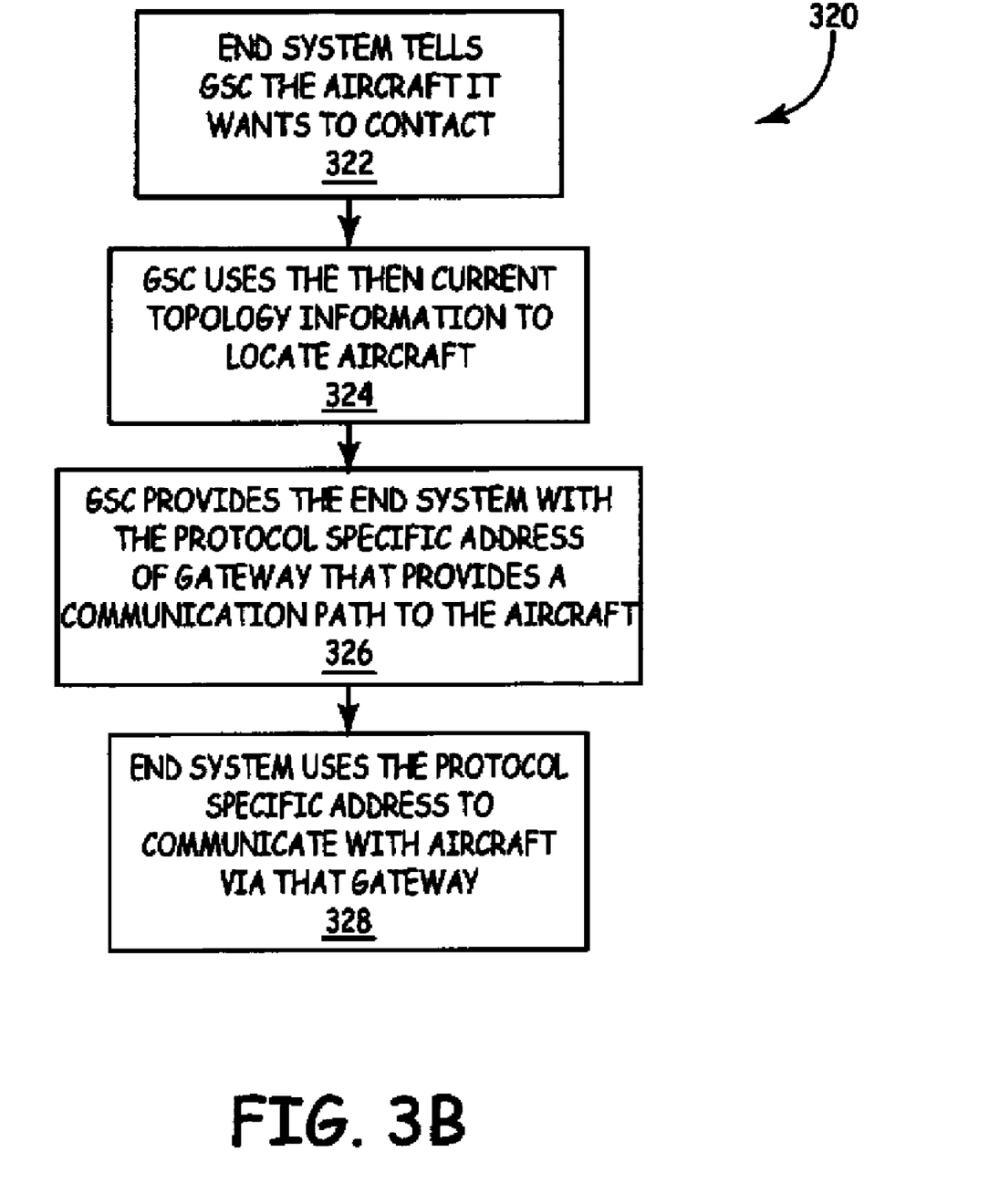
FIG. 3B illustrates an uplink message flow diagram of another embodiment of the present invention.

FIG. 3B illustrates another upload message flow diagram (320) of another embodiment of the present invention. In this embodiment, the process starts when the end system 104 determines it needs to send a message to an aircraft 102. The end system 104 sends a message to the GSC 106 indicating the destination aircraft (322). Based on the then current topology information that it has, the GSC 106 determines which gateway 102-5, 102-6 or 102-11, provides an optimal communication link to the select aircraft (324). In one embodiment, a domain name server (DNS) like server is used to translate a host name of the gateway to a protocol specific address such as an IP address. The GSC 106 then provides the protocol specific address of the gateway 102-5, 102-6 or 102-11 to the end system 104 (326). The end system 104 then uses the IP address to communicate with the aircraft 102 via the select gateway 102-5, 102-6 or 102-11. For example, referring to FIG. 1, end system 104 wants to send a message to aircraft 102-10. In this embodiment, end system 104 tells GSC 106-1 (which can be referred to as a route computing system 106-1) that it wants to send a message to aircraft 102-10. GSC 106-1 checks its then current topology and determines that an optimal path to aircraft 102-10 is through gateway 102-11. GSC 106-1 then sends the protocol specific address of gateway 102-11 to the end system 104. End system 104 then sends its message to aircraft 102-10 using the protocol specific address for gateway 102-11. Gateway 102-11 then extracts the message and transmits it to the destination aircraft 102-10.

Figure 4:
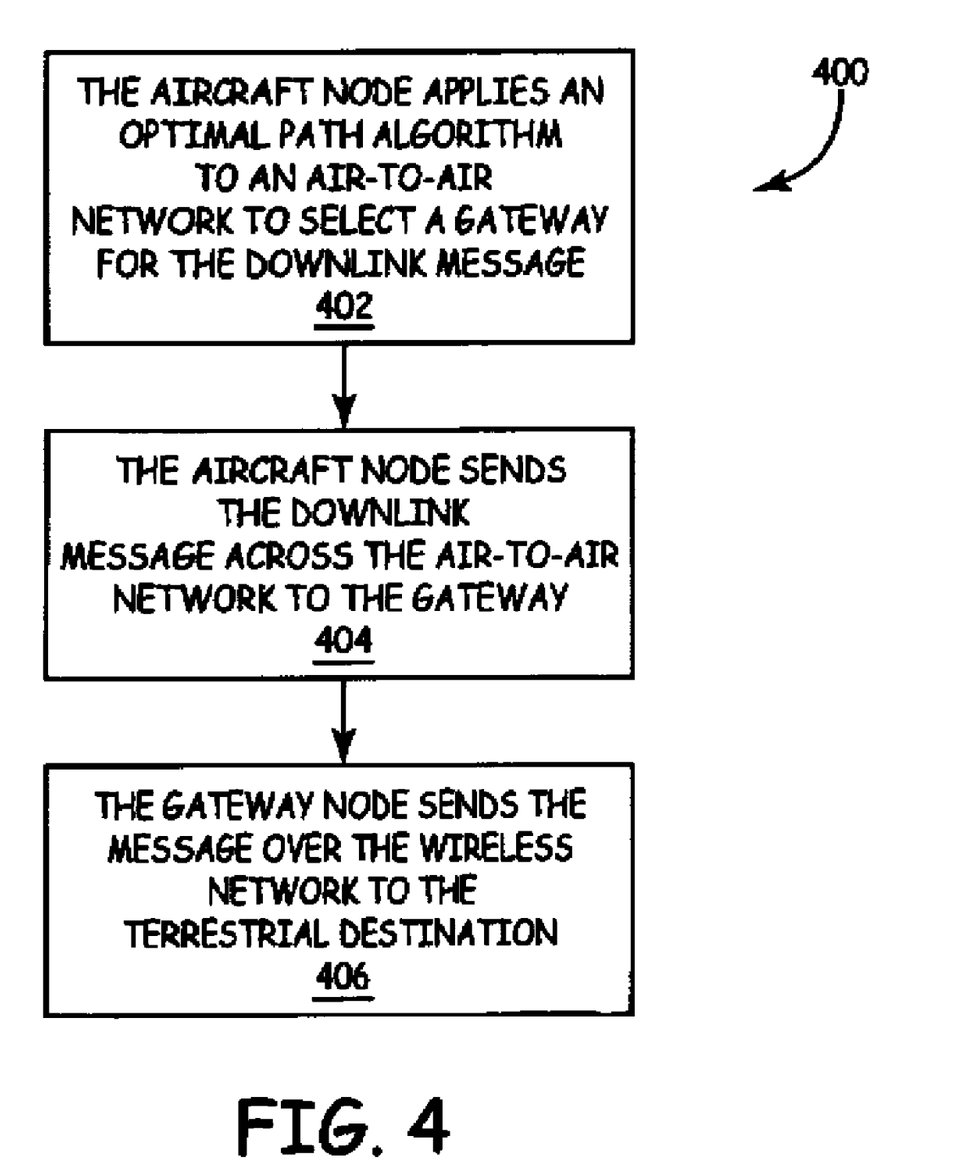
FIG. 4 illustrates a downlink message flow diagram of one embodiment of the present invention.

FIG. 4, illustrates a downlink message flow diagram 400 of one embodiment. In this example, a message is to be sent from an aircraft to the select end system. First the originating aircraft determines a gateway aircraft to use to deliver the downlink message. In one embodiment, an optimal path algorithm is applied to the topology of the air-to-air network associated with the aircraft to select the gateway aircraft (402). The downlink message is then passed through the air-to-air network to the gateway aircraft (404). The gateway aircraft then communicates the message over the WN where it is delivered to the terrestrial destination (406). In one embodiment, the gateway aircraft is configured with the terrestrial destination address and basic internet routing. In another embodiment, the source aircraft addresses the message to the end-system directly without the need to configure each gateway aircraft. If the downlink is addressed for multiple end destinations (multicast), at least one of the gateway aircraft and source aircraft has routing capabilities with multiple end-system addresses configured. As discussed above, the gateway aircraft, in response to a triggering event, will advertise to its associated air-to-air ad-hoc network that it is unavailable as a gateway to the ground. In one embodiment, a timeout is used for the gateway usage since the gateway aircraft is expected to periodically advertise its availability as a gateway to the air-to-air network as discussed above.

Referring to FIG. 1, an example of a downlink message is discussed. In this example, aircraft 102-8 needs to send a downlink message to end system 104. Once aircraft 102-8 determines that it needs to send the downlink message, it determines the best route to send the message to end system 104. In particular, aircraft 102-8 will apply an optimal path algorithm to select a path. In this case, aircraft 102-8 can use either gateway aircraft 102-6 or 102-11. Since, the path to gateway aircraft 102-6 is optimal, that is the path that will be chosen by the routing algorithm. This path consists of aircraft 102-7 and the gateway aircraft 102-6. As illustrated, the gateway aircraft 102-6 is within the radio range 112-2 of WN point of ground station 108-2. As described above, the gateway aircraft 102-6 encapsulates the downlink message in a protocol specific message directed to the destination end system 104. The gateway aircraft then transmits the protocol specific message to ground station 108-2 via the WN. Based on the message being addressed to destination end system 104, routers of the terrestrial network send the message to end system 104 through communication links 114-2.

It will be understood that, although the above examples discuss communicating messages between aircraft and terrestrial end systems, embodiments can exchange messages between aircraft using the communication network 100 as described above. For example, the GSC 106 and related WN can serve to offer a more spectrum efficient method to enable two mobile nodes 102 (one source and one destination) to communicate. In this embodiment, the message would originate in a mobile node, follow the optimal routing over the mobile-to-mobile network to a WN gateway 102-5, 102-6 or 102-11, then be transmitted over a terrestrial network to a WN gateway 102-5, 102-6 or 102-11 with optimal air-to-air routing to the destination mobile node 102.

Figure 5:
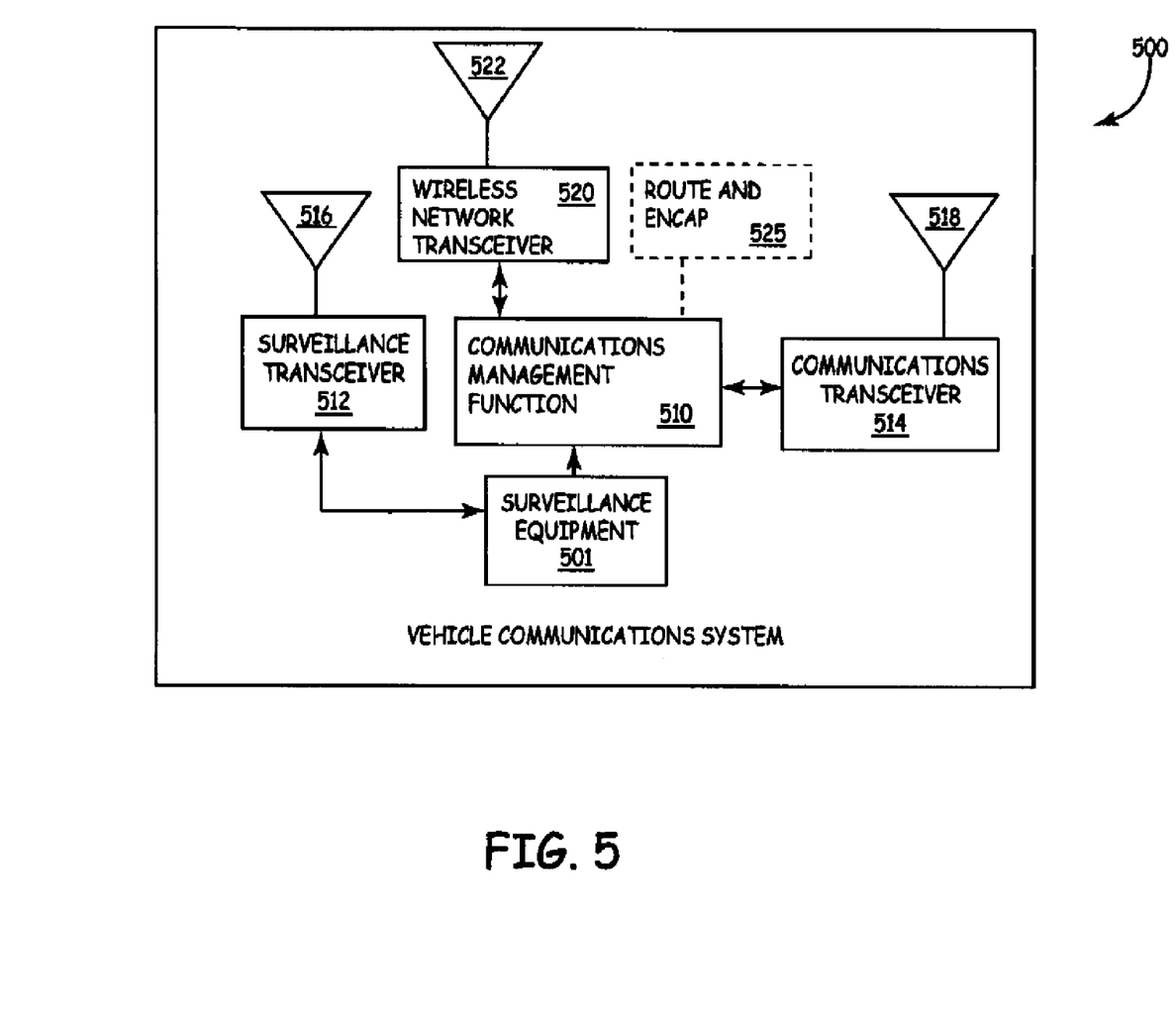
FIG. 5 is a block diagram of a vehicle communication system of one embodiment of the present invention.

FIG. 5 illustrates a vehicle communication system 500 block diagram of one embodiment of the present invention. The vehicle communication system 500 includes a communication management function (CMF) 510 that controls the communications of the communication system. In this embodiment, the vehicle communication system 500 includes two communication transceivers, an air-to-air network transceiver (HF, VHF, or other system) 514 and a wireless network (WN) transceiver (520). The air-to-air network transceiver 514 sends and receives signals via antenna 518 and WN transceiver 520 sends and receives signals via antenna 522. The air-to-air network transceiver 514 is used to send and receive air-to-air signals with other aircraft to form the ad-hoc air-to-air network. The WN transceiver 520 is used to send and receive wireless signals over a communication network such as WiMAX, WRAN or similar wireless communication scheme to allow access to the terrestrial network such as but not limited to the Internet or other private IP network. In embodiments, when the WN transceiver 520 is in communication with a WN, the CMF 510 enters into the gateway mode and directs the WN transceiver 520 to send register signals and unregister signals to a GSC as discussed above in regards to FIG. 2. Also illustrated in FIG. 5 are route and encapsulate algorithms 525 that are used by the CMF. The route algorithms are used to determine the optimal route to a select destination in the communication network. The encapsulate algorithms are used to encapsulate and extract downlink and uplink messages in protocol specific messages as discussed above. As further discussed above, in some embodiments the CMF addresses encapsulated downlink messages to the GSC. FIG. 5, further includes a surveillance transceiver 512 and an associated antenna 516 which in one embodiment is used in part for discovery of air-to-to air network of aircraft as is discussed in the commonly owned patent application Ser. No. 12/025,685.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of operating an aircraft communication system, the method comprising:
   establishing a connection between at least one aircraft that is a member of an air-to-air communication network of aircraft and a ground station that is a part of a wireless network;
   using the connection to communicate messages between an aircraft in the air-to-air communication network and a terrestrial end system;
   in response to establishing the connection between the aircraft and the ground station, sending a register message and topology information from the aircraft to a route computing system, wherein the register message and topology information are sent via the wireless network and a terrestrial network that is in communication with the wireless network;
   in response to establishing the connection between the aircraft and the ground station, advertising by the aircraft to other aircraft in the air-to-air communication network that the aircraft is available as a gateway node between the air-to-air communication network and the wireless network; and
   dynamically updating topology information maintained by the route computing system based on the topology information received from the aircraft.

2. The method of claim 1, further comprising:
   routing messages to a select aircraft in the air-to-air communication network via the gateway based on the then current topology information of the air-to-air communication network and on position information of the air-to-air communication network.

3. The method of claim 1, further comprising:
   translating network addresses of downlink messages from aircraft in the air-to-air communication network to network addresses that can be sent over the wireless network; and
   translating network addresses of uplink messages received over the wireless network to network addresses that can be sent over the air-to-air communication network.

4. The method of claim 1, further comprising:
   registering the gateway with the route computing system.

5. The method of claim 4, further comprising:
   upon at least one of prior to leaving and upon leaving the radio range of the wireless network, sending an unregister signal to the route computing system to unregister the gateway and advertising to the other aircraft in the air-to-air network that the designated gateway will cease to provide gateway functions.

6. The method of claim 1, further comprising:
   advertising to any aircraft in the air-to-air communication networks of the status of their associated gateway.

7. The method of claim 1, further comprising:
   providing a protocol specific address for the gateway and a communication peer based on a supplied node identifier.

8. An aircraft communication system for use in an aircraft, the system comprising:
   a communication transceiver configured to communicate messages between aircraft in an associated ad-hoc air-to-air communication network;
   a wireless network transceiver configured to establish a connection with a wireless network; and
   a communication management function configured to switch the aircraft communication system into a gateway mode when the wireless network transceiver has established the connection with the wireless network, wherein the communication management function is configured to, in response to the connection with the wireless network being established, use the wireless network transceiver to send a register message and topology information to a route computing system, wherein the register message and topology information are sent via the wireless network and a terrestrial network that is in communication with the wireless network, and wherein topology information maintained by the route computing system is dynamically updated based on the topology information sent from the aircraft; and
   wherein the communication management function is configured to, in response to the connection with the wireless network being established, use the communication transceiver to advertise to other aircraft in the associated ad-hoc air-to-air communication network that the advertising aircraft is available as a gateway node between the associated ad-hoc air-to-air communication network and the wireless network.

9. The system of claim 8, further comprising:
   a surveillance transceiver: and
   surveillance equipment in communication with the surveillance transceiver, the surveillance equipment and the surveillance transceiver used at least in part by the communication management function to determine the topology of the associated ad-hoc air-to-air communication network.

10. The system of claim 8, wherein the communication management function is further configured to encapsulate downlink messages with protocol specific addresses and extracting messages from uplink messages having protocol specific addresses.

11. The system of claim 8, wherein the communication management function is configured to implement optimal route algorithms to direct messages to select aircraft in the associated ad-hoc air-to-air network.

12. A communication system comprising:
   a ground station controller in communication with at least one wireless network; and
   at least one ad-hoc air-to-air communication network, each ad-hoc communication network made up of a plurality of aircraft in communication with each other, at least one of the plurality of aircraft within the radio range of the wireless network being designated as a gateway to the ad-hoc air-to-air communication network, each gateway including,
      a communication transceiver configured to communicate messages between aircraft,
      a wireless network transceiver configured to communicate with the wireless network, and
      a communication management function configured to switch the aircraft communication system into a gateway mode when the wireless network transceiver has established the connection with the wireless network;
   wherein the communication management function is configured to, in response to the connection with the wireless network being established, use the wireless network transceiver to send a register message and topology information to the ground station controller, wherein the register message and topology information are sent via the wireless network and a terrestrial network that is in communication with the wireless network, and wherein topology information maintained by the ground station controller is dynamically updated based on the topology information sent from the aircraft; and wherein the communication management function is configured to, in response to the connection with the wireless network being established, use the communication transceiver to advertise to other aircraft in the ad-hoc air-to-air communication network that the advertising aircraft is available as a gateway node between the ad-hoc air-to-air communication network and the wireless network.

13. The system of claim 12, further comprising:
a memory coupled to the ground station controller configured to store received topology information regarding the ad-hoc air-to-air communication networks, the ground station controller further configured to determine routes for messages based on the stored topology.

14. The system of claim 13, wherein the ground station controller is further configured to update the stored topology associated with the ad-hoc air-to-air communication network when a more current topology of the ad-hoc air-to-air communication network is received.

15. The system of claim 12, wherein the communication management function is further configured to encapsulate downlink messages into protocol specific messages for transmission by the wireless network transmitter and extract uplink messages from protocol specific messages received by the wireless network transmitter.

* * * * *